(12) United States Patent
Pande

(10) Patent No.: US 9,608,684 B2
(45) Date of Patent: Mar. 28, 2017

(54) NETWORK-ON-CHIP BASED COMPUTING DEVICES AND SYSTEMS

(71) Applicant: WASHINGTON STATE UNIVERSITY, Pullman, WA (US)

(72) Inventor: Partha Pande, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 14/767,992

(22) PCT Filed: Feb. 13, 2014

(86) PCT No.: PCT/US2014/016205
§ 371 (c)(1),
(2) Date: Aug. 14, 2015

(87) PCT Pub. No.: WO2014/127103
PCT Pub. Date: Aug. 21, 2014

(65) Prior Publication Data
US 2016/0006471 A1  Jan. 7, 2016

Related U.S. Application Data
(60) Provisional application No. 61/765,342, filed on Feb. 15, 2013.

(51) Int. Cl.
*H04W 76/02* (2009.01)
*H04B 1/38* (2015.01)
(Continued)

(52) U.S. Cl.
CPC ........... *H04B 1/38* (2013.01); *G06F 13/4265* (2013.01); *G06F 15/7825* (2013.01);
(Continued)

(58) Field of Classification Search
CPC ..................... G06F 13/4265; G06F 15/7825
(Continued)

(56) References Cited

U.S. PATENT DOCUMENTS

| 8,270,316 B1* | 9/2012 | Chang ................. G06F 15/7825 370/254 |
| 2008/0183927 A1* | 7/2008 | Rofougaran ........ G06F 13/4022 710/106 |

(Continued)

OTHER PUBLICATIONS

International Search Report and Written Opinion issued Jun. 3, 2014, in International Application No. PCT/US14/016205.
(Continued)

*Primary Examiner* — John J Lee
(74) *Attorney, Agent, or Firm* — Liang IP, PLLC

(57) ABSTRACT

Several embodiments of the present technology are related to network-on-chip based integrated circuits, methods of manufacturing or fabricating such integrated circuits, and electronic/computing devices incorporating such integrated circuits. In one embodiment, a computing device includes a substrate, a plurality of computing nodes interconnected by a plurality of interconnects on the substrate to form a wired network. The individual computing nodes include one or more computing processors. The computing device further includes a pair of wireless transceivers individually connected to one of the computing nodes and spaced apart from each other by a network diameter of the wired network.

20 Claims, 10 Drawing Sheets

(51) Int. Cl.
  *G06F 15/78*         (2006.01)
  *G06F 13/42*         (2006.01)
  *H04L 12/751*        (2013.01)
  *H04W 84/18*         (2009.01)

(52) U.S. Cl.
  CPC ............. *H04L 45/02* (2013.01); *H04W 76/02*
                    (2013.01); *H04W 84/18* (2013.01)

(58) Field of Classification Search
  USPC ..... 455/550.1, 556.2, 95, 551, 422.1, 426.1,
                                                       455/446
  See application file for complete search history.

(56) References Cited

U.S. PATENT DOCUMENTS

2009/0196199 A1* 8/2009 Rofougaran ..... H03K 19/17744
                                                       370/254
2011/0103799 A1* 5/2011 Shacham ............... H04B 10/25
                                                       398/115

OTHER PUBLICATIONS

International Preliminary Report on Patentability issued Jun. 3, 2014, in International Application No. PCT/US14/016205, 11 pages.

* cited by examiner

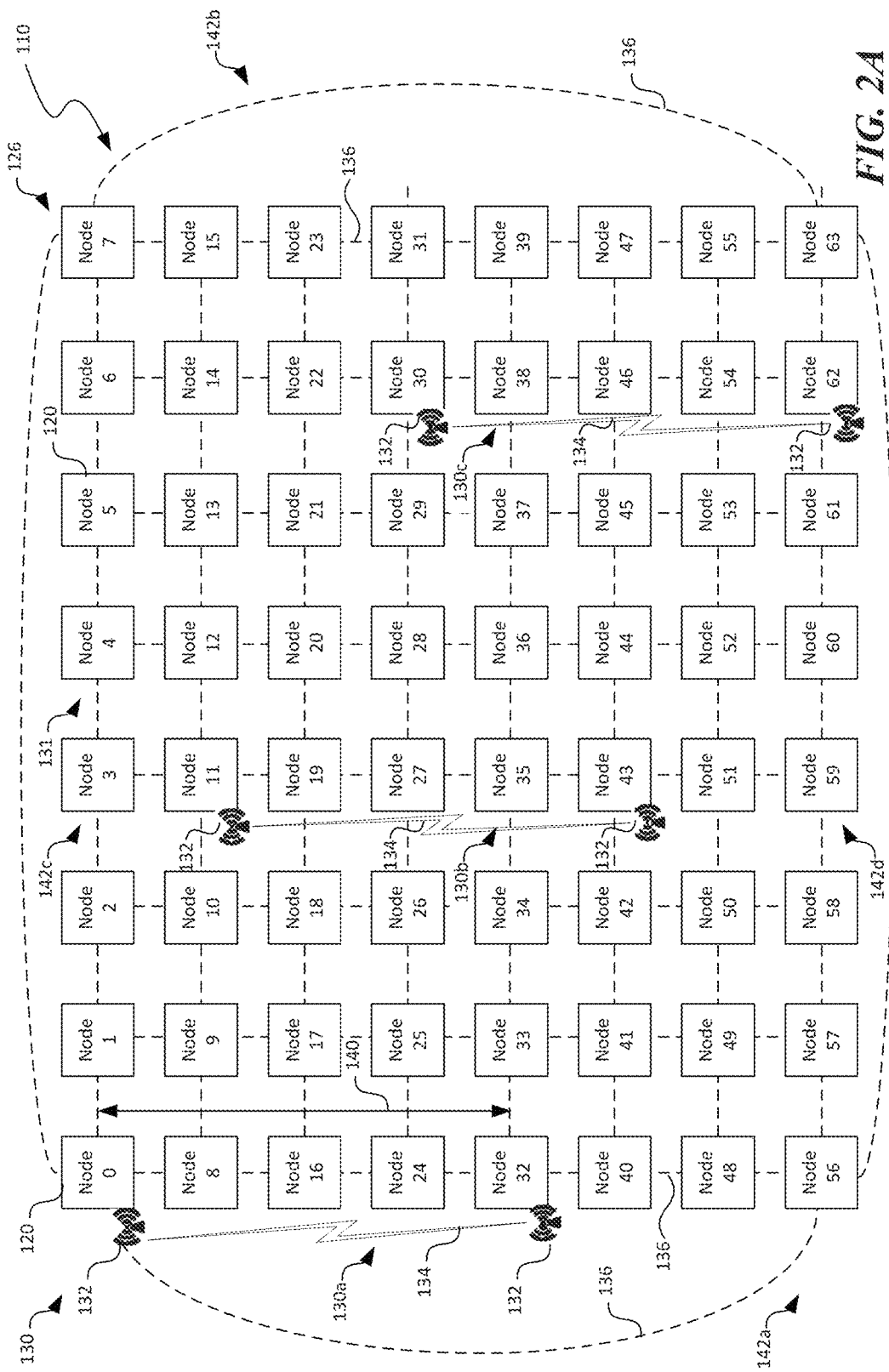

NETWORK-ON-CHIP BASED COMPUTING DEVICES AND SYSTEMS

This application is a U.S. National Stage Application of PCT Application No. PCT/US14/16205, filed Feb. 13, 2014, which claims priority to U.S. Provisional Application No. 61/765,342, filed on Feb. 15, 2013.

BACKGROUND

High computing complexities and computation data demands have contributed to an increase in parallel computing capabilities. For example, individual computing systems can include integrated circuits with multiple built-in logic processors in parallel. The throughput of such integrated circuits can be substantial in order to service multiple concurrent requests from a variety of applications. Other considerations for the integrated circuits can also include energy consumption, power dissipation, temperature control, and/or other parameters.

BRIEF DESCRIPTION OF THE DRAWINGS

FIGS. 2A and 2B are schematic diagrams of computing nodes suitable for the co-processor of FIG. 1 in accordance with embodiments of the technology.

DETAILED DESCRIPTION

Figure 1:
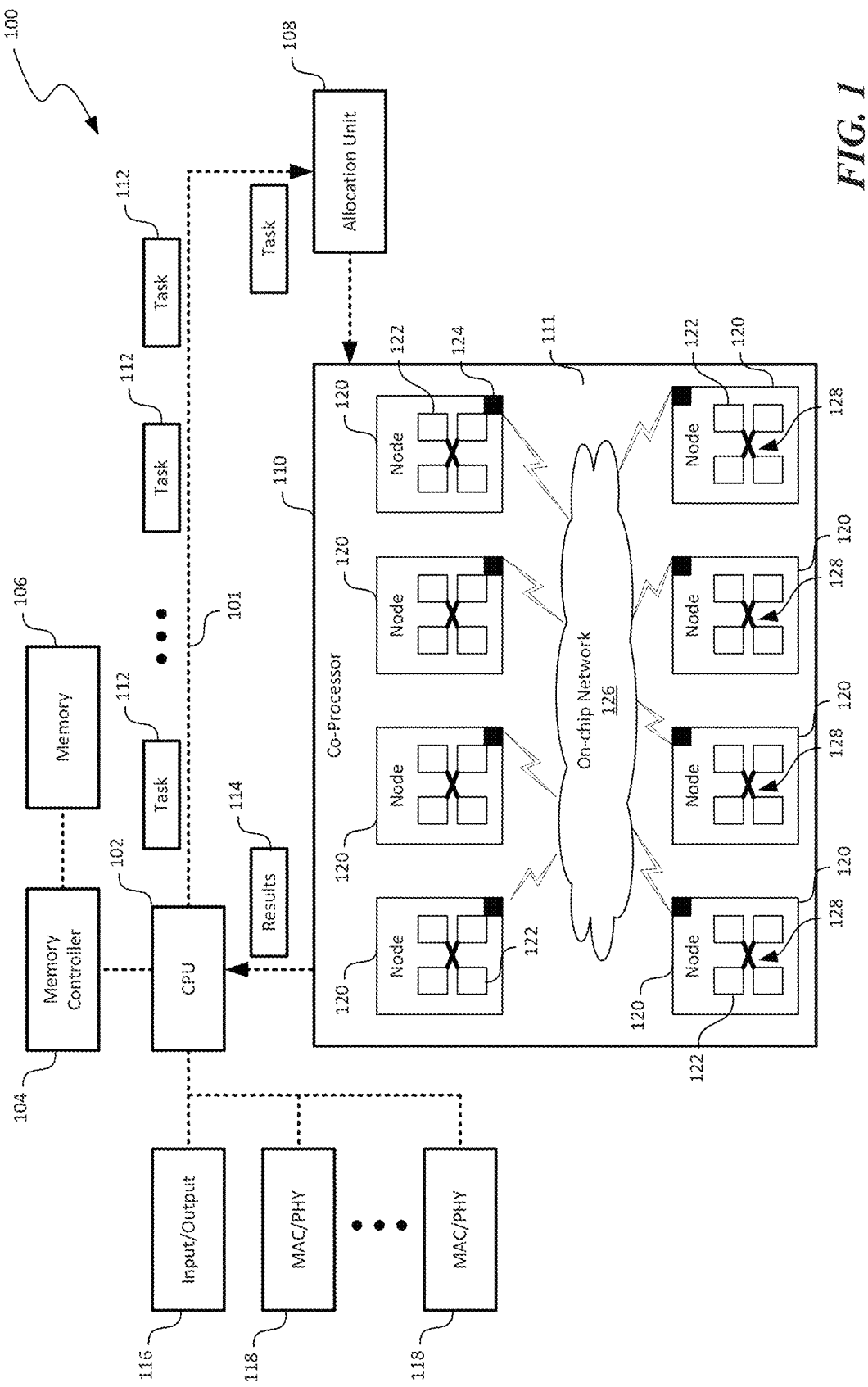
FIG. 1 is a schematic diagram of a computing system in accordance with embodiments of the technology.

This document describes network-on-chip based integrated circuits, computing devices, computing systems, and methods of designing and/or fabricating such integrated circuits. Several of the details set forth below are provided to describe certain embodiments of the technology in a manner sufficient to enable a person skilled in the relevant art to practice, make, and use the present technology. Several of the details and advantages described below, however, may not be necessary to practice certain embodiments and methods of the technology. A person skilled in the relevant art will also understand that the technology may have additional embodiments, and that the technology may be practiced without several of the details of the embodiments described below with reference to FIGS. 1-9.

As used herein, the term "processing element" generally refers to a computing processor configured to perform a general or customized operation. For example, the processing element can be configured to perform logarithmic, exponential, multiplication, comparison, trigonometric, and/or other suitable general operations. In other examples, the processing element may be configured to perform phylogenetic inferences, genome/gene sequencing, climate modeling, weather prediction, video processing, and/or other suitable customized operations.

A processing element may take any suitable forms, For example, a processing element can include a reduced instruction set computing ("RISC") processor. In other examples, a processing element can include a complex instruction set computing ("CISC"), a zero instruction set computer ("ZISC"), a very long instruction word ("VLIW"), and/or other suitable types of computing processor. In further embodiments, a processing element may include multiple and/or a combination of the foregoing types of processors.

Also used herein, the term "computing node" generally refers to a discrete computing facility configured to execute certain computer instructions. In one embodiment, a computing node can include one processing element. In other embodiments, a computing node can include multiple interconnected processing elements arranged in parallel, in series, or in any other suitable configuration. In further embodiments, a computing node may be in communication with one or more other computing nodes via wired and/or wireless connections.

Further, the term "torus interconnect" structure generally refers to a network topology for arranging computing nodes in a computing system. An example network according to torus interconnect structure may include multiple computing nodes arranged in a rectilinear array of a 2, 3, or other suitable number of dimensions. In the rectilinear array, each computing node is electrically connected to the nearest neighboring computing nodes; and corresponding pairs of computing nodes on opposite edges are also connected to one another. Examples of a two-dimensional torus interconnect structure are described in more detail below with reference to FIGS. 2A and 2B.

Network-on-chip ("NoC") is one communication scheme according to which an on-chip communication network links multiple computing nodes via respective network switches on a common substrate. The NoC schemes can notably improve performance of the computing system over conventional buses and/or crossbar interconnections. However, the on-chip communication network may impede further performance improvement of the computing system because network traffic congestion can become a bottleneck. Several embodiments of the present technology implement a hybrid wired and wireless NoC communication scheme that can facilitate fast and efficient communications over the on-chip communication network, as described in more detail below.

FIG. 1 is a schematic diagram of a computing system 100 in accordance with embodiments of the technology. As shown in FIG. 1, the computing system 100 can include a central processing unit ("CPU") 102, a memory controller 104, a memory 106, an input/output module 116, an allocation unit 108, a co-processor 110, and one or more media access control ("MAC")/physical layer ("PHY") components 118 interconnected by a communication link 101 (e.g., a PCI bus). In certain embodiments, at least some of the foregoing components may be fabricated on a common substrate (not shown), commonly referred to as system-on-chip ("SoC") scheme. For example, the CPU 102, the memory controller 104, the memory 106, the input/output module 116, and the one or more MAC/PHY components 118 can be fabricated on a common substrate. In other embodiments, the foregoing components may be independent from one another.

The CPU 102 can include a general purpose computing processor. The CPU 102 can also include an arithmetic logic unit configured to perform arithmetic and/or logic operations and a control unit configured to retrieve instructions from the memory 106 via the memory controller 104. In one embodiment, the memory controller 104 and the memory 106 include a dynamic random access memory ("DRAM") controller and DRAM, respectively. In other embodiments, the memory controller 104 and the memory 106 can include flash memory and/or other suitable types of computer readable storage media.

The input/output module 116 can be configured to facilitate communication of the CPU 102 with other components of the computing system 100 and/or external devices (not shown). For example, the input/output module 116 can include hardware/software components that interface with the communication link 101, a keyboard, a mouse, a computer display, a printer, a hard disk drive, an optical disk drive, and/or other suitable peripherals. Examples components for the input/output module 116 can include bridges, bus interfaces, and/or other suitable components.

The MAC/PHY components 118 can be individually configured to connect a link layer device (e.g., a media access control layer) to a physical medium (e.g., an optical fiber, a copper wire, etc.). The MAC/PHY components 118 can include a physical coding sub-layer (not shown) configured to encode and/or decode data transmitted/received via a physical medium dependent layer (not shown). Example MAC/PHY components 118 can include interfaces for WiFi, RS232, Ethernet, universal serial bus, firewire, and/or other suitable communication media.

The allocation unit 108 can be configured to assign one or more tasks 112 from the CPU 102 to the co-processor 110. In one embodiment, the allocation unit 108 can assign the tasks 112 in a first-in-first-out manner. In other embodiments, the allocation unit 108 can assign the tasks 112 in other suitable manners based on at least one of a priority, a computation resource requirement, a computation intensity, and/or other suitable characteristics of the tasks 112. In the illustrated embodiment, the allocation unit 108 is shown as an independent component from the co-processor 110 and the CPU 102. In other embodiments, the allocation unit 108 may be integral to the co-processor 110 and/or the CPU 102.

The co-processor 110 can be configured to perform general and/or customized operations in cooperation with the CPU 102. As shown in FIG. 1, the co-processor 110 can include a plurality of computing nodes 120 (eight are shown for illustration purposes) on a substrate 111 and interconnected with one another by an on-chip network 126. Even though the co-processor 110 is shown as independent from the CPU 102 in FIG. 1, in other embodiments, the co-processor 110 may be incorporated into or embedded in the CPU 102.

The individual computing nodes 120 can include one or more processing elements 122 interconnected to one another by electrical interconnects 128 (e.g., copper traces). Four processing elements 122 are shown for illustration purposes in FIG. 1 though the computing nodes 120 may each include any suitable number of processing elements 122. In the illustrated embodiment, the individual computing nodes 120 also include a network switch 124 connected to the on-chip network 126. The network switches 124 can include crossbar switches or other suitable types of switches configured to accommodate packet switching, circuit switching, and/or other suitable types of switching. In certain embodiments, the computing nodes 120 may be arranged according to a torus interconnect structure in 2, 3, and/or other suitable number of dimensions. In other embodiments, the computing nodes 120 may be arranged according to a star topology, a tree topology, and/or other suitable topology.

As shown in FIG. 1, the computing nodes 120 are interconnected with one another by the on-chip network 126. In certain embodiments, the on-chip network 126 can include a wired network 131 (shown in FIG. 2A) in which multiple interconnects 136 (shown in FIG. 2A) each electrically connecting a pair of neighboring computing nodes 120. The co-processor 110 can also include one or more wireless links 130 (shown in FIG. 2A) individually coupled to certain ones of the computing nodes 120 to facilitate high volume processing on the co-processor 110.

In operation, the CPU 102 can execute a parent process assisted by other components of the computing system 100. During execution of the parent process, the CPU 102 can generate one or more tasks 112 for the co-processor 110. The generated tasks 112 are then communicated to the allocation unit 108 via the communication link 101. The allocation unit 108 then assigns the individual tasks 112 to one or more computing nodes 120 of the co-processor 110. The one or more computing nodes 120 then executes the assigned tasks 112 and return results 114 to the CPU 102 via the communication link 101.

During execution of the one or more tasks 112, the one or more computing nodes 120 can each perform a part of the assigned tasks 112 in parallel, in series, and/or in other suitable manners. The one or more computing nodes 120 can also communicate with one another via the on-chip network 126 to generate the results 114. For example, the network switches 124 of the computing nodes 120 may be actuated to form wired communications channels between pairs of computing nodes 120. However, the inventor has recognized that increasing physical lengths of the wired communication channels can increase communications delays on the co-processor 110. As a result, the wired communication channels may form communications bottlenecks in the execution of the assigned tasks 112.

In accordance with aspects of the present technology, the on-chip network 126 of the co-processor 110 can also include one or more pairs of wireless links 130 (FIGS. 2A and 2B) positioned at select locations to facilitate efficient communications among the computing nodes 120. In accordance with additional aspects of the present technology, the allocation unit 108 can also be configured to allocate the tasks 112 based on the locations of the wireless links 130 to achieve high throughput while maintaining low power consumption on the co-processor 110 or to optimize the processing power of the overall architecture on a task-by-task basis, as described in more detail below with reference to FIGS. 2A and 2B.

FIG. 2A is a schematic diagram of computing nodes 120 suitable for the co-processor 110 of FIG. 1 in accordance with embodiments of the technology. The co-processor 110 is shown in FIG. 2A as having 64 computing nodes 120 arranged according to a two-dimensional torus interconnect structure for illustration purposes. In other embodiments, the co-processor 110 can include any other suitable numbers of computing nodes 120 arranged according to other suitable topology. For example, the co-processor 110 can include 16, 32, 128, and/or other numbers of computing nodes 120 arranged in a three-, four-, or other suitable numbers of dimensional torus interconnect structure.

As shown in FIG. 2A, each of the computing nodes 120 is electrically connected to a neighboring computing nodes 120 via a wired network 131. For example, the computing node 25 is electrically connected to computing nodes 17, 24, 26, and 33 via respective interconnect 136 (shown as dashed lines for clarity). The interconnect 136 can include traces, vias, and/or other suitable conductive structures constructed from copper, silver, gold, tin, or other suitable electrically conductive or semi-conductive materials.

Also shown in FIG. 2A, the computing nodes 120 can have multiple edges 142 (shown individually as first, second, third, and fourth edge 142a, 142b, 142c, and 142d, respectively). For instance, in the illustrated embodiment, the first edge 142a can be along computing nodes 0, 8, 16, 24, 32, 40, 48, and 56. The second edge 142b can be along computing nodes 7, 15, 23, 31, 39, 47, 55, and 63. The third edge 142c can be along computing nodes 0, 1, 2, 3, 4, 5, 6, and 7. The fourth edge 142d can be along computing nodes 56, 57, 58, 59, 60, 61, 62, and 63.

The computing nodes 120 located on opposite edges are electrically connected via respective interconnect 136. For example, computing node 0 is electrically connected to computing node 56, and computing node 7 is electrically connected to computing node 63. Computing node 0 is electrically connected to computing node 7, and computing node 56 is also electrically connected to computing node 63. Only two wired interconnects 136 are shown for each pair of opposite edges in FIG. 2A for illustration purposes. Other computing nodes 120 on opposite edges are also electrically connected.

Figure 2B:
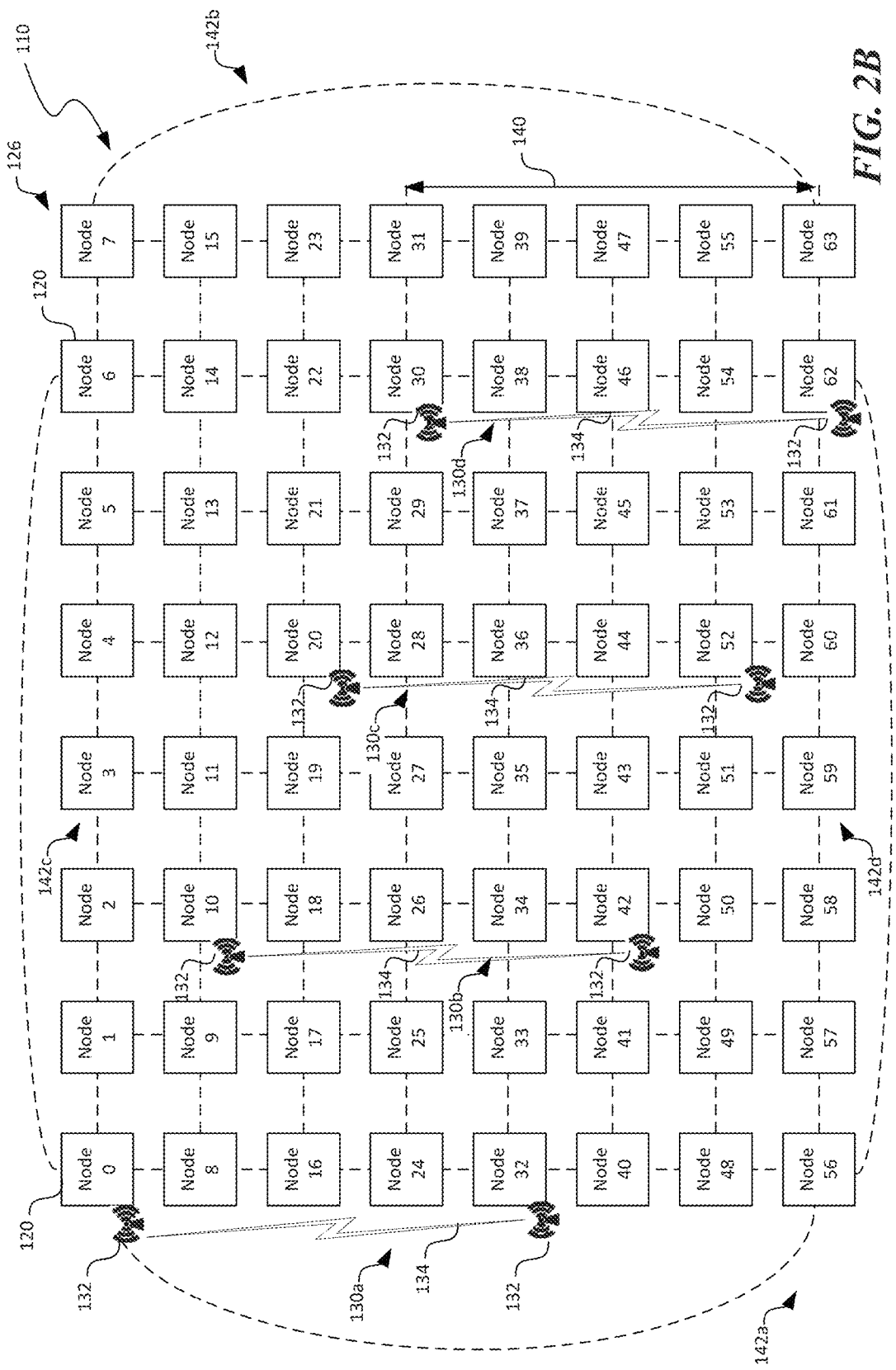

As shown in FIG. 2A, the co-processor 110 can also incorporate one or more wireless links 130 in the on-chip network 126. In the illustrated embodiment, the wireless links 130 include first, second, and third pairs of wireless links 130a, 130b, and 130c. The individual wireless links 130 can be implemented via a pair of wireless transceivers 132 configured to communicate with each other via a wireless communications channel 134. The wireless transceivers 132 can include CMOS-based, CMOT-based transceivers, nanotube-based transceivers, and/or other suitable types of transceivers. One example wireless transceiver is described below with reference to FIGS. 3A and 3B. In another embodiment, as shown in FIG. 2B, the wireless links 130 can be implemented via four pairs of wireless links 130 (individually illustrated as first, second, third, and fourth wireless links 130a, 130b, 130c, and 130d, respectively). Though the four wireless links 130 are shown as equally spaced apart from one another, in other embodiments, the four wireless links 130 may have other suitable spacing arrangements. In further embodiments, the wireless links 130 can include one, two, or any other suitable number of wireless links.

Referring back to FIG. 2A, the individual pairs of wireless links 130a, 130b, and 130c can be connected to and enable certain computing nodes 120 to communicate in a point-to-point manner. For example, the first wireless link 130a can enable communications between computing nodes 0 and 32; the second wireless link 130b can enable communications between computing nodes 11 and 43; and the third wireless link 130c can enable communications between computing nodes 30 and 62. The communications via the wireless links 130 can adopt frequency division multiple access, time division multiple access, and/or other suitable protocols.

In accordance with aspect of the present technology, the wireless links 130 can individually be spaced apart by a diameter of the on-chip network 126. As used herein, the term "diameter" of a network generally refers to the longest of all the calculated shortest communication paths in a network. The communication path can include one or more "hops" each between a pair of adjacent nodes. For example, as shown in FIG. 2A, the shortest communication paths between computing node 0 and nodes 8, 16, 24, 32, 40, 48, and 56 are listed below:

| | |
|---|---|
| Computing node 8 | 1 |
| Computing node 16 | 2 |
| Computing node 24 | 3 |
| Computing node 32 | 4 |
| Computing node 40 | 3 |
| Computing node 48 | 2 |
| Computing node 56 | 1 |

Thus, the longest communication path in the on-chip network 126 is 4, as represented by the double arrow 140. Similar calculations can reveal similar results for other computing nodes 120.

In the illustrated embodiment, the three wireless links 130a, 130b, and 130c are placed spaced apart equally from one another. In other embodiments, the three wireless links 130a, 130b, and 130c can be placed in other suitable fashion. For example, if communication traffic is heavier along the first edge 142a than the second edge 142b, the second wireless link 130b may be placed adjacent the first wireless link 130a. If communication traffic is heavier along the third edge 142c than the fourth edge 142d, the second and third wireless links 130b and 130c may be shifted up to be generally aligned with the first wireless link 130a.

In operation, the computing nodes 120 can communicate with other computing nodes 120 via both the wired network 131 and the wireless links 130. For example, computing node 0 can communicate with computing nodes 8 and 16 via the wired network 131. Computing node 0 can also communicate with computing node 32 via the first wireless link 130a. Further, computing node 0 can communicate with computing node 24 via (1) the first wireless link 130a and the wired network 131 through computing node 32; or (2) via the wired network 131 through computing nodes 8 and 16.

The inventor has recognized that placing the wireless links 130 spaced apart by the diameter of the on-chip network 126 can reduce or even lead to the lowest network latency among other placement choices. Without being bound by theory, it is believed that the low network latency is a result of preferentially allocating tasks 112 (FIG. 1) to contiguous computing nodes 120. As a result, long range communication links arise when allocated computing nodes 120 are non-continuous, as discussed in more detail below with reference to the Experiment section.

Figure 3A:
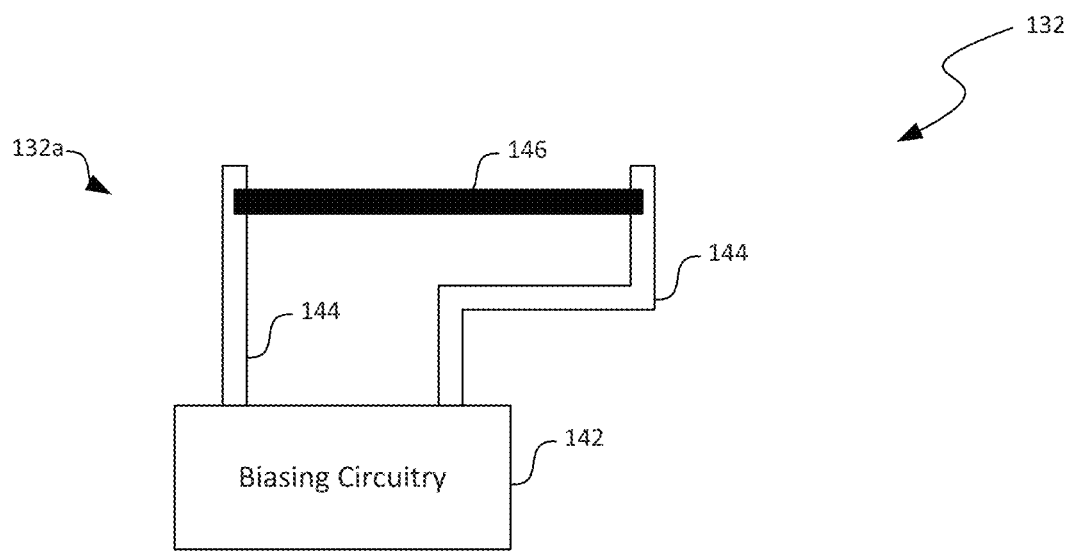
FIGS. 3A and 3B are schematic diagrams of a wireless transmitter and a wireless receiver, respectively, suitable for the wireless transceiver of FIGS. 2A and 2B in accordance with embodiments of the technology.
Figure 3B:
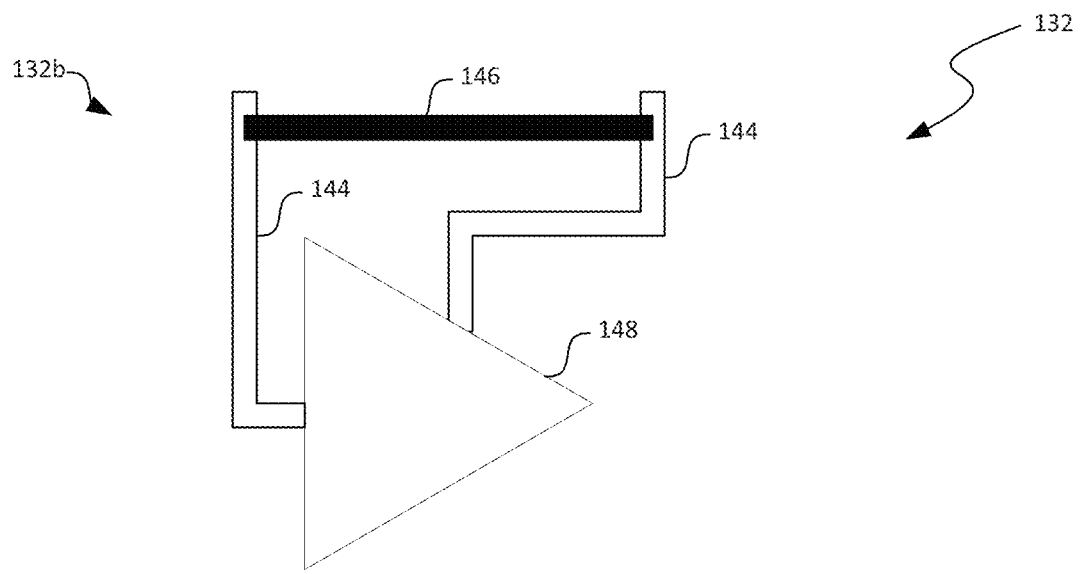

FIGS. 3A and 3B are schematic diagrams of a wireless transmitter 132a and a wireless receiver 132b, respectively, suitable for the wireless transceiver 132 of FIGS. 2A and 2B in accordance with embodiments of the technology. As shown in FIG. 3A, the wireless transmitter 132a can include a driving circuitry 142 electrically coupled to a carbon nanotube antenna 146 via electrical connections 144 (e.g., copper traces). The driving circuitry 142 can include one or more capacitive, resistive, and/or inductive elements. As shown in FIG. 3B, the wireless receiver 132b can include an amplifier 148 electrically connected to a carbon nanotube antenna 146 via electrical connections 144. The wireless transmitter 132a and receiver 132b are shown in FIGS. 3A and 3B for illustration purposes. In other embodiments, the wireless transmitter 132a and receiver 132b can have other suitable components in other suitable arrangements such as CMOS-based or CMOT-based transceivers.

Figure 3C:
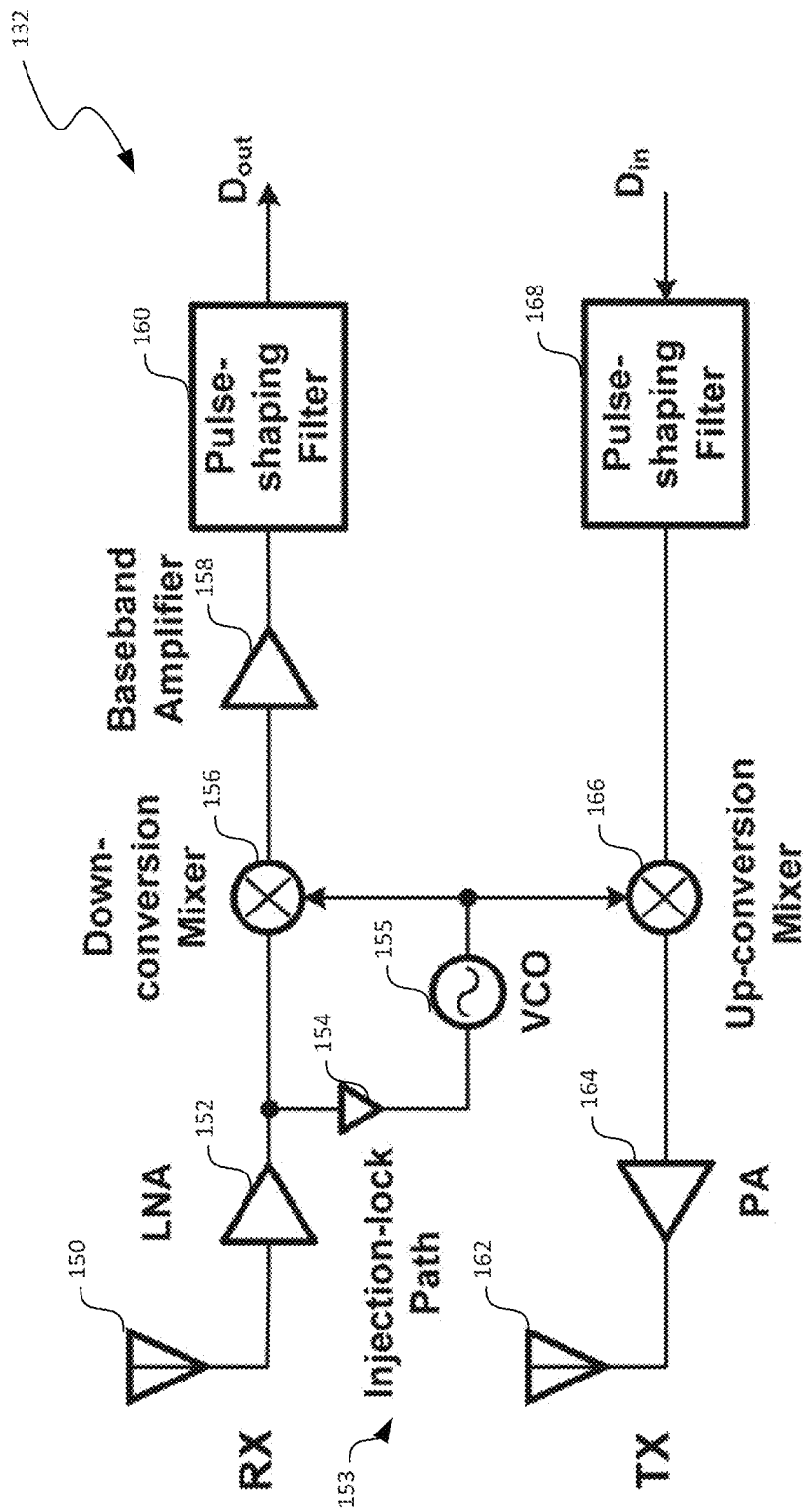
FIG. 3C is schematic diagram of another wireless transceiver suitable for the wireless transceiver of FIGS. 2A and 2B in accordance with embodiments of the technology.

FIG. 3C is a schematic diagram illustrating another example wireless transceiver 132 in accordance with embodiments of the technology. As shown in FIG. 3C, the wireless transceiver 132 can include a receiver antenna (RX) 150, a low-noise amplifier (LNA)152, an injection-lock path 153 having an amplifier 154 and a voltage-controlled oscillator (VCO) 155, a down-conversion mixer 156, a baseband amplifier 158, and a first pulse-shaping filter 160 operatively coupled to one another. The wireless transceiver 132 can also include a transmitting antenna (TX) 162, a power amplifier (PA) 164, an up-conversion mixer 166, and a second pulse shaping filter 168 operatively coupled to one another. The down-conversion mixer 156 and the up-conversion mixer 166 are electrically coupled to one another. Even though particular embodiments of the wireless transceiver 132 are described above with reference to FIGS. 3A-3C, in other embodiments, the wireless transceiver 132 can include other suitable components and/or configurations.

Figure 4:
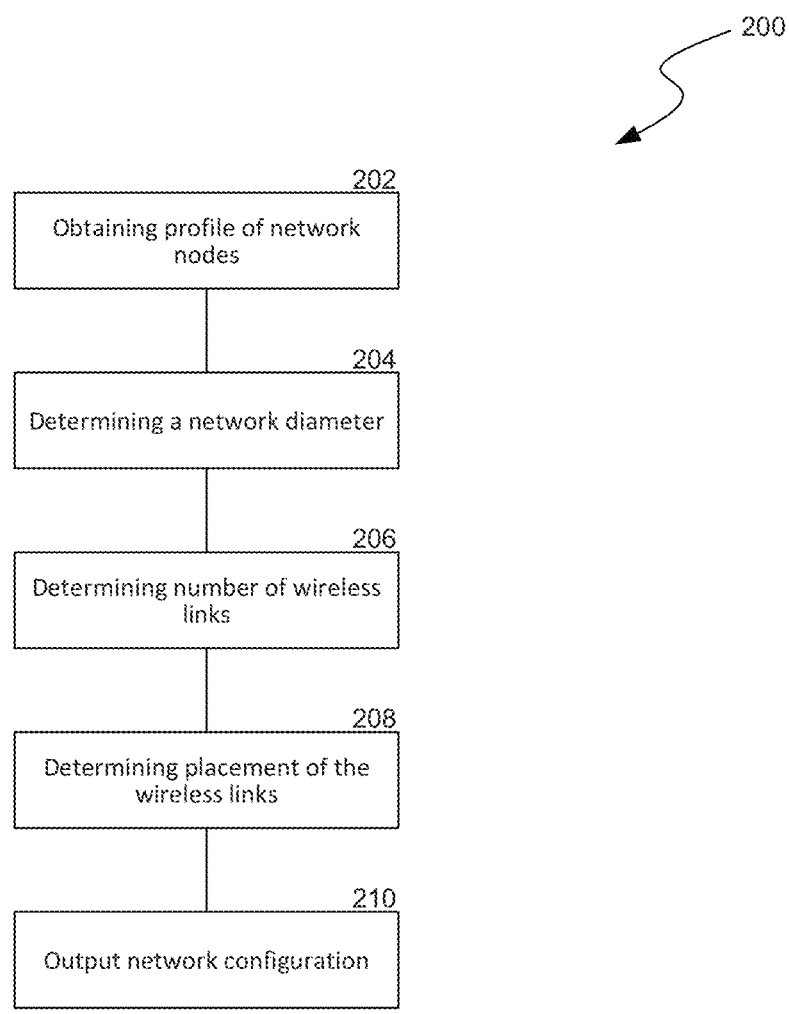
FIG. 4 is a flowchart illustrating a method of configuring and/or manufacturing computing nodes with wireless links in accordance with embodiments of the technology.

FIG. 4 is a flowchart illustrating a method 200 of configuring and/or manufacturing computing nodes with wireless links in accordance with embodiments of the technology. Even though the method 200 is described below with reference to the computing system 100 of FIG. 1, embodiments of the method 200 may also be implemented in other suitable computing systems with additional and/or different components.

As shown in FIG. 4, the method 200 can include obtaining a profile of network nodes at stage 202, for example, from a processor designer or other suitable sources. In one embodiment, the profile of the network nodes can include a number of nodes, interconnectivity of the network nodes, a wired connection length between pairs of nodes, a topology of the nodes, and/or other suitable information. For example, a profile of the on-chip network 126 (FIG. 1) can include 64 computing nodes 120 (FIG. 2A) connected in a torus interconnect structure with a wired connection length of one between each adjacent pairs of computing nodes 120. In other embodiments, the profile of the network nodes may be user selected and/or defined in other suitable manners.

The method 200 can then include determining a network diameter based on the profile of the network nodes at stage 204. In one embodiment, the network diameter can be derived by (1) calculating the shortest communication path between each pair of nodes based on the profile of the network nodes; (2) comparing the calculated shortest communication paths to one another to obtain the longest communication path; and (3) setting the obtained longest communication path as the network diameter. In other embodiments, the network diameter may be user defined and/or determined in other suitable manners.

The method 200 can then include determine a number of wireless links for the computing nodes at stage 206. In one embodiment, the number of wireless links can be user selected. In another embodiment, the number of wireless links can be determined based on an amount of available space on the substrate 111 (FIG. 1) to accommodate the wireless links. In yet another embodiment, the number of wireless links can also be determined based on a target communication latency, throughput, and/or other suitable parameters.

The method 200 can further include determining placement of the determined number of wireless links at stage 208. In one embodiment, the wireless links may be placed according to an expected, estimated, or desired communication pattern. For example, the wireless links may be placed to congregate in an area of the substrate 111 expected to have high communication traffic. In another example, the wireless links may be equally spaced from one another if the expected communication pattern is random. In any of the foregoing embodiments, the individual wireless links can be spaced apart by the determined network diameter. Optionally, the method 200 can then include outputting the determined network configuration at stage 210.

Various implementations of source, intermediate, and/or object code and associated data of the method 200 described above may be stored in one or more computer readable storage media that include read-only memory, random-access memory, magnetic disk storage media, optical storage media, flash memory devices, and/or other suitable media. As used herein, the term "computer readable storage medium" excludes propagated signals, per se.

EXPERIMENTS

Experiments were conducted to study network latency, throughput, power consumption, and other parameters of a co-processor generally similar to that described above with reference to FIG. 2A. A multicore device that included custom-designed computing nodes arranged in an on-chip network according to a torus interconnect structure was used for evaluation. On-chip wireless links using carbon nanotubes were inserted into the on-chip network. Different strategies to allocate computational resources were explored. The results of the experiments showed that the co-processor had the lowest network latency when wireless links were placed spaced apart by the network diameter of the computing nodes.

For evaluation purposes, computing nodes were designed to perform a specific calculation though the design can be modified to accommodate other kinds of calculations. The computing nodes were designed to compute vector products on floating point numbers and elementary functions (e.g., logarithms and exponentials). Each of the computing nodes can communicate with other computing nodes through respective network switches and the on-chip network. Each computing node included four similar computation cores to carry out arithmetic operations. Fixed-Point Hybrid Number System (FXP-HNS) was used to represent floating point numbers. 64-bits were used for number representation. Thus, the core data path is 64-bit wide.

Wireless Link Placement

Figure 5:
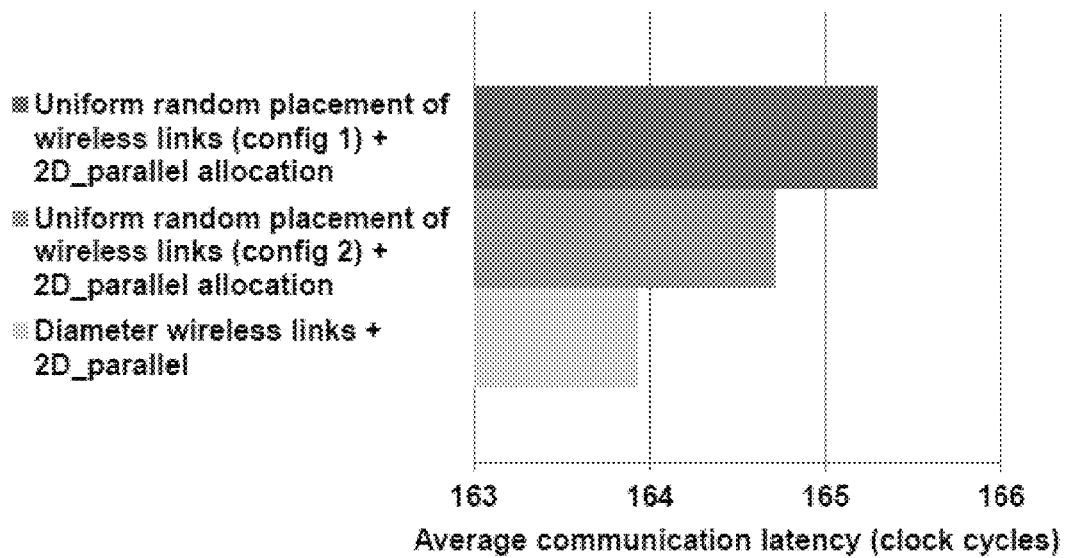
FIG. 5 is a bar graph illustrating an example average communication latencies based on various placements of wireless links in accordance with embodiments of the technology.

The placement of wireless links may be dictated by demands in traffic patterns generated by a target application. However, sometimes, it may not be possible to statically predict any particular traffic patterns because underlying communication requirements may be arbitrary. The computing nodes executing a single task may be spread out, thereby generating arbitrary point-to-point traffic over time. The probability of non-local interaction between computing nodes was observed to be the highest when separation between the computing nodes is equal to a diameter of the network. As shown in FIG. 5, wireless links placed spaced apart by the diameter of the network lead to the lowest network latency among other possibilities.

Dynamic Node Allocation

A computing node may be busy during execution of a task but may be available otherwise. The computing nodes can send a busy/available status to an allocation unit 108 (FIG. 1). When a task requests computation resources, the allocation unit 108 can allocate a requisite number of available computing nodes to the task. The allocated computing nodes can thus form a partition during the course of execution and communicate with one another via the on-chip network.

It may be desirable that the partition includes computing nodes co-located so as to reduce or minimize an average number of hops in communications. The following allocation methods were studied. The studied allocation methods can be classified into wireless-agnostic and wireless-aware methods. A Hilbert curve was also sued for allocation. The resultant allocated partitions were denoted A-type if all nodes belonging to that partition are contiguous along wired links; else the partition is B-type.

Experimental Setup

The computation node has a data path width of 64 bits and provided a number representation accuracy of ~10-15. The wired NoC interconnects were laid out and physical parameters (power dissipation, delay) were determined using the extracted parasitic (resistances and capacitances). It was verified that all wired links could be traversed within one clock cycle. Each wireless link had seven channels of 10 Gbps each, providing a total link bandwidth of 70 Gbps. An energy dissipation of 0.33 pJ/bit for the wireless links was used to evaluate total energy consumption.

Different allocation methods were experimented. System sizes of N=64 and N=256 were used in the experiments. For experimental studies, function kernels from a Maximum Likelihood-based phylogenetic reconstruction software called RAxML version 7.0.4 were used. A detailed profiling of RAxML runs revealed that a small set of functions consume a predominant portion (>85%) of the runtime. These functions were offloaded to the co-processor and are denoted by f6, f3 and f2 respectively based on the computation resources (number of computing nodes) need for execution.

Based on composition of tasks, task loads were grouped into two categories—one in which f6 tasks were dominant and the other in which f3 and f2 tasks occupied up to half of all the computing nodes. The total number of jobs concurrently executing was clearly higher in the latter case. Each f6 individually required the largest number of computing nodes (six), the probability that one would be allocated a contiguous partition was relatively low.

Computation Throughput

Figure 6:
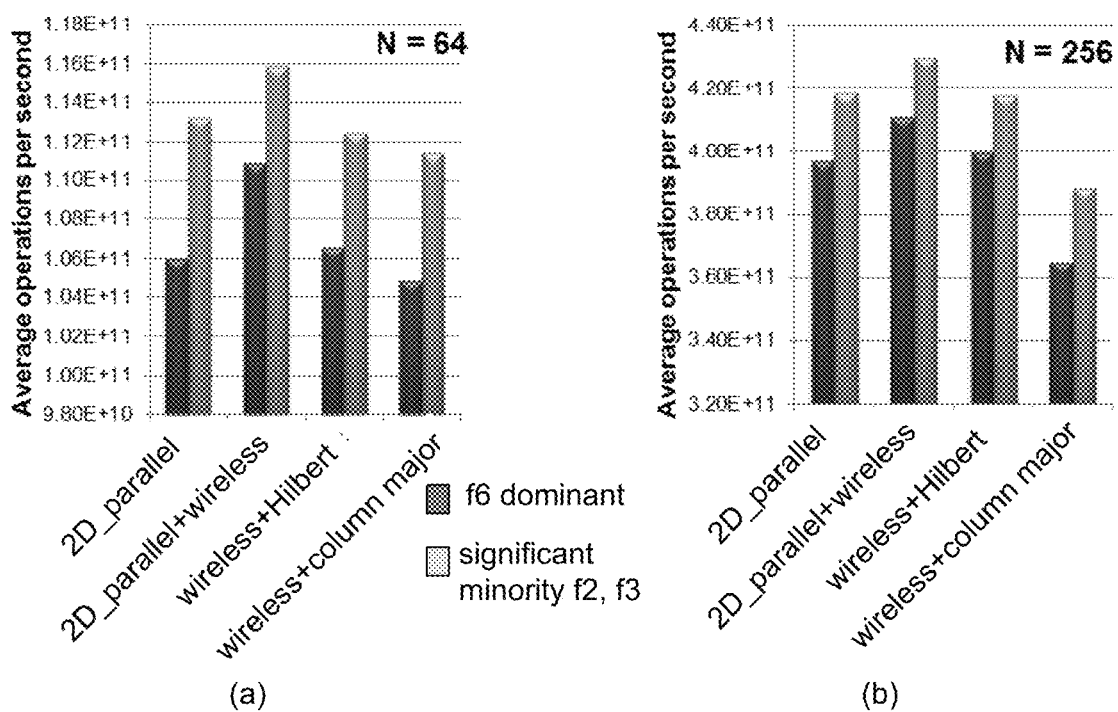
FIG. 6 illustrates bar graphs showing examples of average operations per second based on various task assignment regimes in accordance with embodiments of the technology.

Throughput was measured using basic operations (logarithm and exponentiation) performed by a computing node and the number of operations per second. It was observed that the throughput was not only affected by a mix of tasks but also by allocation time overhead, usage of wireless links, and network architecture. FIG. 6 shows example throughput for the two different task loads mentioned above. As can be seen from FIG. 6, 2D_parallel+wireless provided the best throughput.

FIG. 6 also shows that experiments with a higher proportion of f2 and f3 tasks had a 5-10% higher computation throughput than the f6 dominant scenario. A larger system size (FIG. 6(b)) provided proportional gain in computation throughput. The lowest parallelization efficiency was obtained for wireless+column-major and may be attributed to the high allocation-time overheads for larger system sizes.

Figure 7:
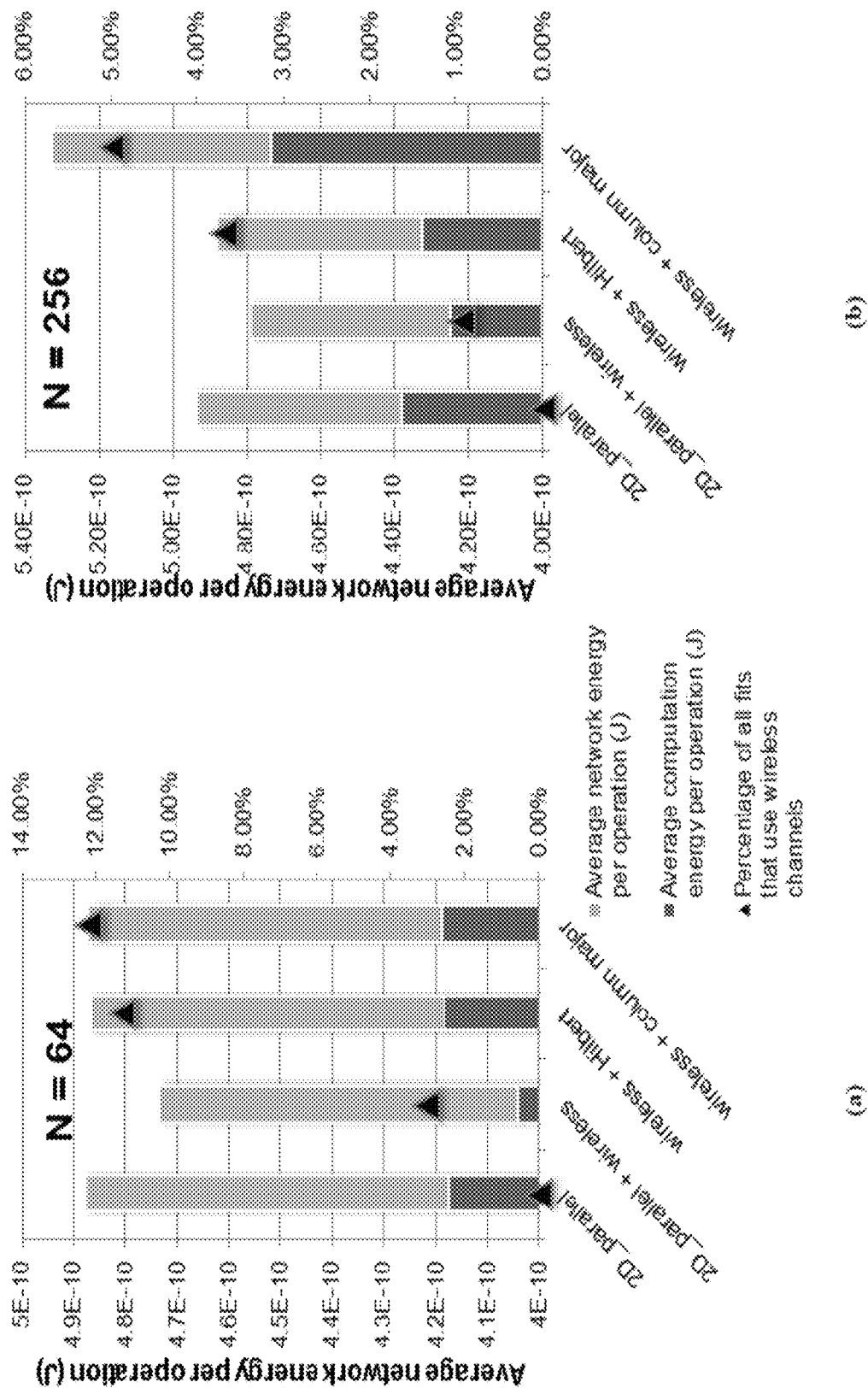
FIG. 7 illustrates bar graphs showing examples of average network energy per operation based on various task assignment regimes in accordance with embodiments of the technology.

It was also observed that the best performing architecture had a wireless-agnostic allocation method. FIG. 7 shows the percentage of total data that used the wireless links. As shown in FIG. 7, wireless-aware allocation methods may pass a larger proportion of data through the wireless links. In a wireless-agnostic allocation method such as 2D_parallel+wireless, the number of A-type partitions was maximized during allocation, leaving the wireless links to carry traffic for B-type partitions.

Energy and Power Consumption

Figure 8:
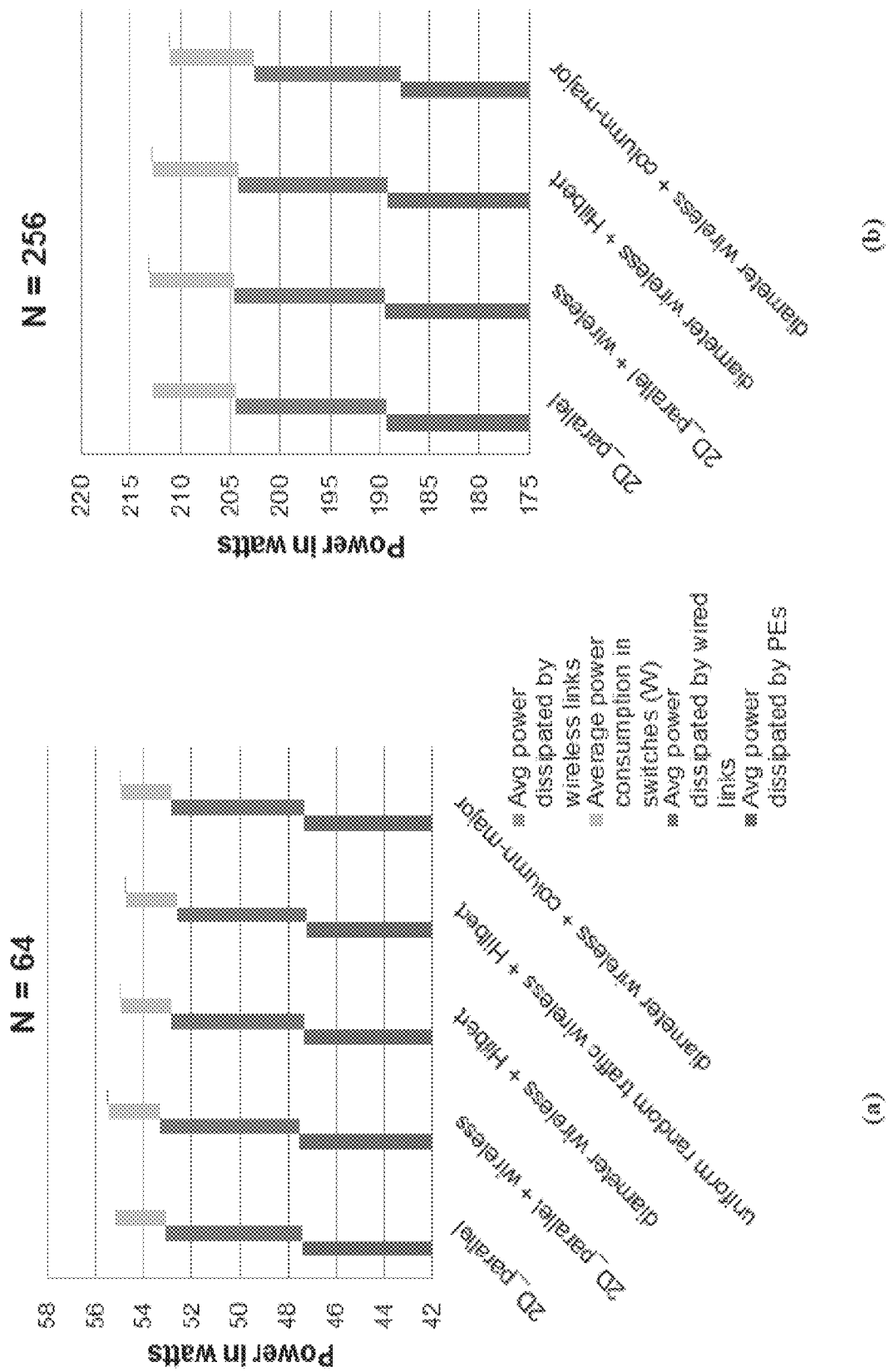
FIG. 8 illustrates bar graphs showing examples of power consumption based on various task assignment regimes in accordance with embodiments of the technology.

FIG. 8 shows average power dissipation in different NoC architectures and system sizes. As shown in FIG. 8, the average power dissipation was higher in architectures that delivered higher computation throughput. Also, wireless-aware allocation methods consistently lead to lower average power dissipation.

In order to determine which architecture is indeed the most energy-efficient, energy spent per operation was evaluated. The energy spent per operation includes the computation energy of the computing nodes and the network energy of the network switches, wireless transceivers, and wired links. FIG. 8 shows a comparison of the energy spent per operation for different network architectures and system sizes. 2D_parallel+wireless was the most energy-efficient in terms of overall energy consumption per operation. For N=64, the network energy was lower for the wireless-aware methods, wireless+Hilbert, and wireless+column-major. However, due to higher computation latencies and the greater contribution of the computation energy, the overall energy per operation turned out to be higher. For N=256, the proportion of network data using wireless links was low across all architectures, and the saving in energy due to using wireless links was more than offset by the additional energy consumption in the wired links. Thus, 2D_parallel+wireless was the best performing architecture from the energy-efficiency perspective.

Traffic Statistics

Figure 9:
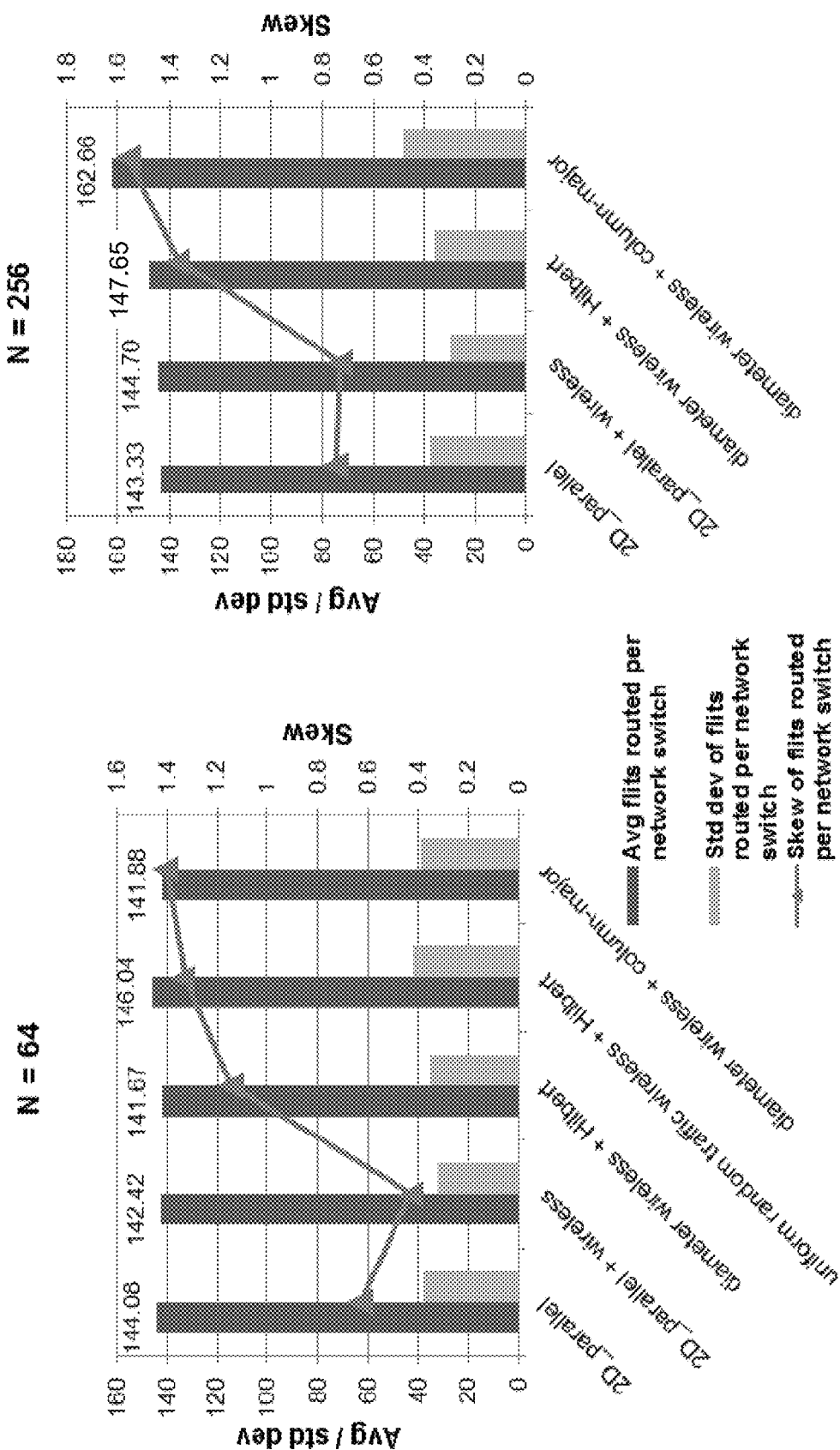
FIG. 9 illustrates bar graphs showing examples average, standard deviation, and skew of flits routed per network switch based on various task assignment regimes in accordance with embodiments of the technology.

The data traffic was characterized in terms of first, second and third order statistical properties, and correlated with throughput, energy consumption, and power dissipation. FIG. 9 shows the mean, standard deviation and skew of the number of bits routed per network switch across all 64 (256) switches for N=64 (N=256). For N=64, the mean values were about the same across architectures; for N=256, diameter wireless+column-major needed to route more bits per network switch, which indicated congestion and reduced throughput. The standard deviation varied across architectures for both system sizes, and was the least for 2D_parallel+wireless. Traffic was clearly less skewed for wireless-agnostic architectures than for wireless-aware architectures.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

I claim:

1. A computing device, comprising:
   a substrate;
   a plurality of computing nodes interconnected by a plurality of interconnects to form a wired network on the substrate, the individual interconnects including an electrically conductive or semi-conductive material connecting pairs of adjacent computing nodes, wherein the individual computing nodes include one or more computing processors; and a pair of wireless transceivers on the substrate, the pair of wireless transceivers being individually connected to one of the computing nodes and spaced apart from each other by a network diameter of the wired network, wherein the pair of wireless transceivers is configured to establish a point-to-point connection between the corresponding connected computing nodes.

2. The computing device of claim 1 wherein the network diameter is a longest of a plurality of shortest network paths between pairs of the computing nodes.

3. The computing device of claim 1 wherein the computing nodes are arranged according to a torus interconnect structure, and wherein the pair of wireless transceivers is configured to establish a wireless link along the network diameter of the wired network.

4. The computing device of claim 1 wherein the computing device further includes one or more additional pairs of wireless transceivers, each pair of the wireless transceivers being spaced apart from one another by the network diameter of the wired network.

5. The computing device of claim 1 wherein:
the computing device further includes one or more additional pairs of wireless transceivers, each pair of the wireless transceivers being spaced apart from one another by the network diameter of the wired network; and
the pair of wireless transceivers and the one or more additional pairs of wireless links are generally equally spaced apart from one another.

6. The computing device of claim 1 wherein:
the computing device further includes one or more additional pairs of wireless transceivers, each of the additional pairs of the wireless transceivers being spaced apart from one another by the network diameter of the wired network and configured to establish a point-to-point connection between corresponding computing nodes; and
the pair of wireless transceivers and the one or more additional pairs of wireless links are generally equally spaced apart from one another.

7. The computing device of claim 1 wherein:
the computing device further includes one or more additional pairs of wireless transceivers, each of the additional pairs of the wireless transceivers being spaced apart from one another by the network diameter of the wired network and configured to establish a point-to-point connection between corresponding computing nodes; and
the pair of wireless transceivers and the one or more additional pairs of wireless links are configured to a plurality of wireless links individually along the network diameter of the wired network.

8. The computing device of claim 1, further comprising one or more additional wireless transceivers each capable of communicating with all other wireless transceivers.

9. A method for manufacturing a computing device, the method comprising:
determining a network diameter of a wired network having computing nodes interconnected by a plurality of interconnects on a substrate, the network diameter being a longest of a plurality of shortest network paths between pairs of the computing nodes;
determining placement of one or more pairs of wireless transceivers on the substrate, the wireless transceivers being individually connected to one of the computing nodes, wherein each of the one or more pairs of wireless transceivers are spaced apart from each other by the network diameter; and
outputting the obtained profile of the wired network and the placement of the one or more pairs of wireless transceivers.

10. The method of claim 9, further comprising determining a number of the wireless transceivers for placement on the substrate based on space availability on the substrate.

11. The method of claim 9 wherein determining the network diameter includes:
calculating a shortest network path between each pair of computing nodes in the wired network;
determining the longest network path in the calculated shortest network paths between the pairs of the computing nodes; and
setting the network diameter to be the determined longest network path.

12. The method of claim 9 wherein determining the placement of one or more pairs of wireless transceivers includes placing the one or more pairs of wireless transceivers according to a network traffic pattern of the computing nodes.

13. The method of claim 9 wherein determining the placement of one or more pairs of wireless transceivers includes placing the one or more pairs of wireless transceivers equally spaced from one another.

14. The method of claim 9, further comprising obtaining a profile of the wired network of computing nodes on the substrate, the profile including at least one of a number of the computing nodes, interconnectivity of the computing nodes, a wired connection length between pairs of the computing nodes, or a topology of the computing nodes, and wherein determining the network diameter includes determining a network diameter based on the obtained profile of the wired network.

15. A computing system having a central processing unit, a memory, and a co-processor having:
a substrate;
a plurality of computing nodes interconnected by a plurality of interconnects to form a wired network on the substrate, the individual interconnects including an electrically conductive or semi-conductive material connecting pairs of adjacent computing nodes, wherein the individual computing nodes include one or more computing processors; and
a pair of wireless transceivers on the substrate, the pair of wireless transceivers being individually connected to one of the computing nodes and spaced apart from each other by a network diameter of the wired network, the network diameter being a longest of a plurality of shortest network paths between pairs of the computing nodes.

16. The computing system of claim 15 wherein the co-processor further includes one or more additional pairs of wireless transceivers, each pair of the wireless transceivers being spaced apart from one another by the network diameter of the wired network.

17. The computing system of claim 15 wherein:
the co-processor further includes one or more additional pairs of wireless transceivers, each pair of the wireless transceivers being spaced apart from one another by the network diameter of the wired network; and
the pair of wireless transceivers and the one or more additional pairs of wireless links are generally equally spaced apart from one another.

18. The computing system of claim 15 wherein:

the co-processor further includes one or more additional pairs of wireless transceivers, each pair of the wireless transceivers being spaced apart from one another by the network diameter of the wired network and configured to establish a point-to-point connection between corresponding computing nodes; and the pair of wireless transceivers and the one or more additional pairs of wireless links are generally equally spaced apart from one another.

19. The computing system of claim 15 wherein:

the co-processor further includes one or more additional pairs of wireless transceivers, each pair of the wireless transceivers being spaced apart from one another by the network diameter of the wired network and configured to establish a point-to-point connection between corresponding computing nodes; and the pair of wireless transceivers and the one or more additional pairs of wireless links are configured to a plurality of wireless links individually along the network diameter of the wired network.

20. The computing system of claim 15 wherein the co-processor comprising one or more additional wireless transceivers each capable of communicating with all other wireless transceivers.

\* \* \* \* \*